(12) United States Patent
LaBelle

(10) Patent No.: US 10,775,301 B2
(45) Date of Patent: Sep. 15, 2020

(54) BIOLOGY-BASED ENHANCED VISION USING LIGHT AMPLIFICATION AND ADAPTABLE TO THIN FILMS

(71) Applicant: ARIZONA BOARD OF REGENTS ON BEHALF OF ARIZONA STATE UNIVERSITY, Scottsdale, AZ (US)

(72) Inventor: Jeffrey LaBelle, Tempe, AZ (US)

(73) Assignee: Arizona Board of Regents of Behalf of Arizona State University, Scottsdale, AZ (US)

( * ) Notice: Subject to any disclaimer, the term of this patent is extended or adjusted under 35 U.S.C. 154(b) by 383 days.

(21) Appl. No.: 15/546,790

(22) PCT Filed: Feb. 3, 2016

(86) PCT No.: PCT/US2016/016372
§ 371 (c)(1),
(2) Date: Jul. 27, 2017

(87) PCT Pub. No.: WO2016/133706
PCT Pub. Date: Aug. 25, 2016

(65) Prior Publication Data
US 2018/0095029 A1 Apr. 5, 2018

Related U.S. Application Data

(60) Provisional application No. 62/116,683, filed on Feb. 16, 2015.

(51) Int. Cl.
*G02B 23/12* (2006.01)
*G01N 21/35* (2014.01)
(Continued)

(52) U.S. Cl.
CPC .............. *G01N 21/35* (2013.01); *C09K 11/06* (2013.01); *G02B 23/12* (2013.01); *H01J 29/385* (2013.01); *H01J 31/50* (2013.01)

(58) Field of Classification Search
CPC .... G01N 21/35; G01N 21/64; G01N 21/6456; G01N 21/6486; G01N 33/533–537;
(Continued)

(56) References Cited

U.S. PATENT DOCUMENTS

| 5,406,089 A | 4/1995 | Koppikar |
| 6,416,960 B1 * | 7/2002 | Bryan ................ A61K 49/0013 424/130.1 |

(Continued)

FOREIGN PATENT DOCUMENTS

| WO | 2004023099 A2 | 3/2004 |
| WO | 2014077725 A1 | 5/2014 |

(Continued)

OTHER PUBLICATIONS

Adelean, I.I., et al Bioelectrochemical fuel cells with Anabaena SP. Research in Photosynthesis vol. II, Kluwer Academic Pub. 1992, 623-626.

(Continued)

*Primary Examiner* — Mustak Choudhury
(74) *Attorney, Agent, or Firm* — Quarles & Brady LLP; Jessica L. Lewis

(57) ABSTRACT

Methods and apparatus relating to light amplification technology that has the ability to transform and amplify light to be seen in the visible spectrum by the user (FIG. 2). The biologically-based light amplification system including a reaction center, a proton gradient area, and a light amplification area, and may be configured such that light entering the system through the reaction center produces a proton gradient, which in turn acts upon reactants in the proton gradient area, and then causes a product to enter the light amplification area and thereby drive a bioluminescent or
(Continued)

phosphorescent reaction to amplify the light The methods and apparatus use solely biological processes without any external power supply.

15 Claims, 4 Drawing Sheets

(51) Int. Cl.
    *C09K 11/06*     (2006.01)
    *H01J 29/38*     (2006.01)
    *H01J 31/50*     (2006.01)

(58) Field of Classification Search
CPC .. G01N 33/574; G01N 33/581; G01N 33/582; H01J 31/50; H01J 29/385; H01L 31/055; H01L 31/02322; G02B 23/12; G01J 1/58; C09K 11/06; A01G 7/045; A61K 49/0013; A61K 49/0015; A61K 49/0017; A61K 49/0021; C12Q 1/66; C12Q 2304/60; C12N 15/80; C12N 15/8243
See application file for complete search history.

(56) References Cited

U.S. PATENT DOCUMENTS

| | | | |
|---|---|---|---|
| 7,067,293 B2 | 6/2006 | Labelle | |
| 2009/0090410 A1* | 4/2009 | LaBelle | B82Y 10/00 136/248 |
| 2010/0275329 A1* | 10/2010 | Vacharathit | C12N 15/80 800/282 |
| 2011/0027181 A1* | 2/2011 | Amodei | A61K 9/0024 424/9.1 |
| 2011/0150935 A1 | 6/2011 | Grigoriadis et al. | |
| 2013/0040380 A1* | 2/2013 | Hunt | A01G 7/045 435/292.1 |

FOREIGN PATENT DOCUMENTS

| | | |
|---|---|---|
| WO | 2018175448 A1 | 9/2018 |
| WO | 2018208610 A1 | 11/2018 |
| WO | 2019147978 A1 | 8/2019 |

OTHER PUBLICATIONS

Beinart, H. "Copper A of Cytochrome c Oxidase, A Novel, Long-Embattled, Biological Electron-Transfer Site." European journal of biochemistry 245.3 (1997): 521-532.
Birge, R. R. "Photophysics and molecular electronic applications of the rhodopsins." Annual review of physical chemistry 41.1 (1990): 683-733.
Carney, L. G., Thomas F. Mauger, and Richard M. Hill. "Buffering in human tears: pH responses to acid and base challenge." Investigative ophthalmology & visual science 30.4 (1989): 747-754.
Chen, J., et al. "Chemical amplification with encapsulated reagents." Proceedings of the National Academy of Sciences 99.5 (2002): 2593-2596.
Daub, J., et al. "Light-Sensitive Molecular Building Blocks with Electron Transfer Activity: Synthesis and Properties of a Photochemically Switchable, Dicyanovinyl-Substituted Furan." Angewandte Chemie International Edition in English 28.11 (1989): 1494-1496.
Frackowiak D. et al. Orientation of light adapted cyanobacteria in skew stretched polymer films. Research in Photosynthesis vol. I, Kluwer Academic Pub. 1992, 145-148.
Frackowiak, D. et al. "Delayed emission of chlorophyll a aggregates and rhodamine 6G embedded in polymer matrix." Photochemistry and photobiology 58.5 (1993): 737-744.
Gerdts, C. J., et al. "A synthetic reaction network: chemical amplification using nonequilibrium autocatalytic reactions coupled in time." Journal of the American Chemical Society 126.20 (2004): 6327-6331.

Groves, J. T., et al. "Substrate-membrane interactions: Mechanisms for imposing patterns on a fluid bilayer membrane." Langmuir 14.12 (1998): 3347-3350.
Groves, J. T., et al. "Micropatterning fluid lipid bilayers on solid supports." Science 275.5300 (1997): 651-653.
Ho, H., et al. "Contact lens with integrated inorganic semiconductor devices." 2008 IEEE 21st International Conference on Micro Electro Mechanical Systems. IEEE, 2008.
Jónsson, H. "Light metal alloys for hydrogen storage." Collaborative research project at the University of Iceland (2003).
Kirchhoff, J. R. "Luminescence spectroelectrochemistry." Current Separations 16 (1997): 11-14.
Laocharoensuk, R., et al. "Adaptive nanowire-nanotube bioelectronic system for on-demand bioelectrocatalytic transformations." Chemical Communications 32 (2007): 3362-3364.
Leibl, W. et al. Theory on the wavelength-dependent polarity of the light-gradient photvoltage. Research in Photosynthesis vol. I, Kluwer Academic Pub. 1992, 633-636.
López-Alemany, A., et al. "Comparative study of pH for different saline and multi-purpose contact lens solutions." Contact Lens and Anterior Eye 20.3 (1997): 91-95.
Lukashev, E. P., et al. "Photo-electrical properties of bacteriorhodopsin in Langmuir films." Stud. Biophys. 132.1 (1989):111-118.
Michael, K L., et al. "Randomly ordered addressable high-density optical sensor arrays." Analytical chemistry 70.7 (1998):1242-1248.
Miyake, J., et al. Photo-electric responses of chromatophores from Rhodopseudomanas viridis—with a photocell made of tow SnO2 electrode plates. Research in Photosynthesis vol. I, Kluwer Academic Pub. 1992, 445-448.
Musameh, M., et al. "Low-potential stable NADH detection at carbon-nanotube-modified glassy carbon electrodes." Electrochemistry Communications 4.10 (2002): 743-746.
Ohgi, T., et al. "Au particle deposition onto self-assembled monolayers of thiol and dithiol molecules." Applied Surface Science 130 (1998): 919-924.
Pina, F., et al. "Photochromism of 4'-Methoxyflavylium Perchlorate. A "Write- Lock- Read- Unlock- Erase" Molecular Switching System." Journal of the American Chemical Society 119.24 (1997): 5556-5561.
Pita, M. et al. "Multiple logic gates based on electrically wired surface-reconstituted enzymes." Journal of the American Chemical Society 130.1 (2008): 36-37.
Qian, H. "Thermodynamic and kinetic analysis of sensitivity amplification in biological signal transduction." Biophysical chemistry 105.2-3 (2003): 585-593.
Remco Engineering. 2005. Ion Exchange—Basic Concepts (accessed online at remco.com/ix.htm).
Sackmann, E. "Supported membranes: scientific and practical applications." Science 271.5245 (1996): 43-48.
Salafsky, J. et al. "Architecture and function of membrane proteins in planar supported bilayers: a study with photosynthetic reaction centers." Biochemistry 35.47 (1996): 14773-14781.
Schultz, P. G. "Bringing biological solutions to chemical problems." Proceedings of the National Academy of Sciences 95.25 (1998): 14590-14591.
Schumacker, P. T. "Reactive oxygen species in cancer cells: live by the sword, die by the sword." Cancer cell 10.3 (2006):175-176.
Shen, Y. et al. "Detection of hydrogen peroxide produced during electrochemical oxygen reduction using scanning electrochemical microscopy." Analytical chemistry 80.3 (2008): 750-759.
Shibata, T.. "Amplification of noise in a cascade chemical reaction." Physical Review E 69.5 (2004): 056218.
signweb.com 2003 "Color Wheel Theory" accessed online at (http://signweb.com/design/cont/colortheory2.htm).
Takami, T., et al. "Multiply twinned particle micelle." Applied surface science 130 (1998): 834-840.
Wang, J. et al. "Solubilization of carbon nanotubes by Nafion toward the preparation of amperometric biosensors." Journal of the American Chemical Society 125.9 (2003): 2408-2409.
Weetall, H. H. "Retention of bacteriorhodopsin activity in dried sol-gel glass." Biosensors and Bioelectronics 11.3 (1996): 327-333.

(56) References Cited

OTHER PUBLICATIONS

Weitkamp, J., et al. "Zeolites as Media for Hydrogen Storage." (accessed online at http://www.uni-stuttgart.de/sfb270/B7_e.htm) on Jan. 13, 2006.
Wikipedia "Luciferase" accessed online at (http://en.wikipedia.org/wiki/Luciferase) on Feb. 18, 2008, last edited on Jan. 25, 2008.
Yoon, H. C., et al. "Bioelectrocatalyzed signal amplification for affinity interactions at chemically modified electrodes." Biotechnology and Bioprocess Engineering 9.2 (2004): 107-111.
York University. 2006. Dark Adaptation Function. Accessed online at (http://www.yorku.ca/eye/darkadap.htm).
York University. 2006. Visual Sensitivity. Accessed online at (http://www.yorku.ca/eye/sensit.htm).
Zaenker, P. et al. "Serologic autoantibodies as diagnostic cancer biomarkers—a review." Cancer Epidemiology and Prevention Biomarkers 22.12 (2013): 2161-2181.
Zaitsev, SYu, et al. "Polymer membranes with immobilized bacteriorhodopsin." Stud. Biophys. 132.1 (1989): 105-110.
Zandvoort, M. AMJ van, et al. "Spectroscopic study of chlorophyll a in organic solvents and polymerized anhydrous polyvinyl matrix." Photochemistry and photobiology 58.4 (1993): 600-606.
Zhao, X. K, et al. "Semiconductor particles in bilayer lipid membranes. Formation, characterization, and photoelectrochemistry." Journal of the American Chemical Society 110.4 (1988): 1012-1024.
Zharkikh, Y. S., et al.. "Effect of the weak form of adsorption on the Si surface charge." Applied surface science 134.1-4 (1998): 263-266.
Andrews, Tim. Biological Psychology slideshow presentation, retreived online from (https://www.dur.ac.uk/tim.andrews/visual_system_1_handout.pdf) on Oct. 19, 2002.
Anderson, K. S., et al., "Protein Microarray Signature of Autoantibody Biomarkers for the Early Detection of Breast Cancer," Journal of Proteome Research, vol. 10, No. 1, pp. 85-96 (Jan. 7, 2011).
"ProtoArray Human Protein Microarray," Invitrogen (2013).
Wang, J., et al., "Autoantibody Biomarker Discovery in Basal-Like Breast Cancer Using Nucleic Acid Programmable Protein Array," Annual Meeting, American Association for Breast Cancer (Apr. 6, 2014).
Extended European Search Report issued in related European patent application EP15868296, dated Jul. 23, 2018 (13 pp.).
International Search Report and Written Opinion issued on related International Application PCT/US2016/016372, dated Apr. 21, 2016 (14 pp.).
Maxwell et al., Chlorophyll fluorescence—a practical guide. Journal of Experimental Botany. 2000. vol. 51, No. 345: 659-668.

* cited by examiner

BIOLOGY-BASED ENHANCED VISION USING LIGHT AMPLIFICATION AND ADAPTABLE TO THIN FILMS

CROSS REFERENCE

This application represents the U.S. National Stage of International Application No. PCT/US2016/016372, filed Feb. 3, 2016 which claims priority to U.S. provisional patent application 62/116,683 filed on Feb. 16, 2015, the disclosures of which are incorporated by reference herein in their entirety.

TECHNICAL FIELD

This disclosure relates to the field of vision enhancement and more particularly in some aspects to improved perception of IR light using biological system components.

BACKGROUND

Currently, night vision devices gather existing ambient light through the front lens. This light, which is made up of photons, goes into a photocathode tube that changes the photons to electrons. The electrons are then amplified to a much greater number through an electrical and chemical process. The electrons are then pushed against a phosphorus screen that changes the amplified electrons back into visible light that one sees through the eyepiece. The image produced is a green-hued and amplified re-creation of the scene being observed through the night vision device.

Some issues with these devices are that a high voltage power supply is needed, and there is room for improvement when it comes to light amplification capabilities. Furthermore, the need for these power supplies ensures that the device is bulky and not readily adaptable to thin films.

SUMMARY

This disclosure relates to vision enhancement devices and methods that utilize a biologically-based light amplification system including a reaction center, a proton gradient area, and a light amplification area. Some device embodiments are configured such that light entering the system through the reaction center produces a proton gradient, which in turn acts upon reactants in the proton gradient area, and causes a product to enter the light amplification area and thereby drive a bioluminescence or phosphorescent reaction to amplify light.

In one embodiment, this disclosure relates to night vision apparatus and methods that utilizes a solely chemical transference of ambient light and light from the IR (800-900 nm) spectra to the blue-green (400-500 nm) spectra. Thus, the apparatus and methods rid the use of a power supply, photocathode, or micro-channel plate found in modern night-vision devices.

Because the device embodiments utilize solely chemical reactions to transfer and amplify visible light, such embodiments can be small. For example, embodiments of the technology can be arrayed on contact lenses, which has a wide range of benefits in any market where night vision needs are present.

In another embodiment, the apparatus includes a capsule of sequestered biological reagents capable of autocatalysis and chemical amplification.

In another embodiment, the apparatus is a contact lens. The amplification components may by contained by a thin film or membrane, such as poly(2-hydroxyethyl methacrylate) (photoHEMA) film.

These and other aspects are further described in the drawings and detailed description hereinafter.

DETAILED DESCRIPTION

The methods and apparatus described herein relate to light amplification technology that has the ability to transform and amplify light to be seen in the visible spectrum by the user. The apparatus use solely biological processes without any external power supply.

Methods and apparatus described herein relate generally to a biologically-based light amplification system that includes a reaction center, a proton gradient area, and a light amplification area, and may be configured such that light entering the system through the reaction center produces a proton gradient, which in turn acts upon reactants in the proton gradient area, and then causes a product to enter the light amplification area and thereby drive a bioluminescence reaction to amplify the light Because the methods and apparatus use solely biological processes, no external power supply is needed.

Figure 1:
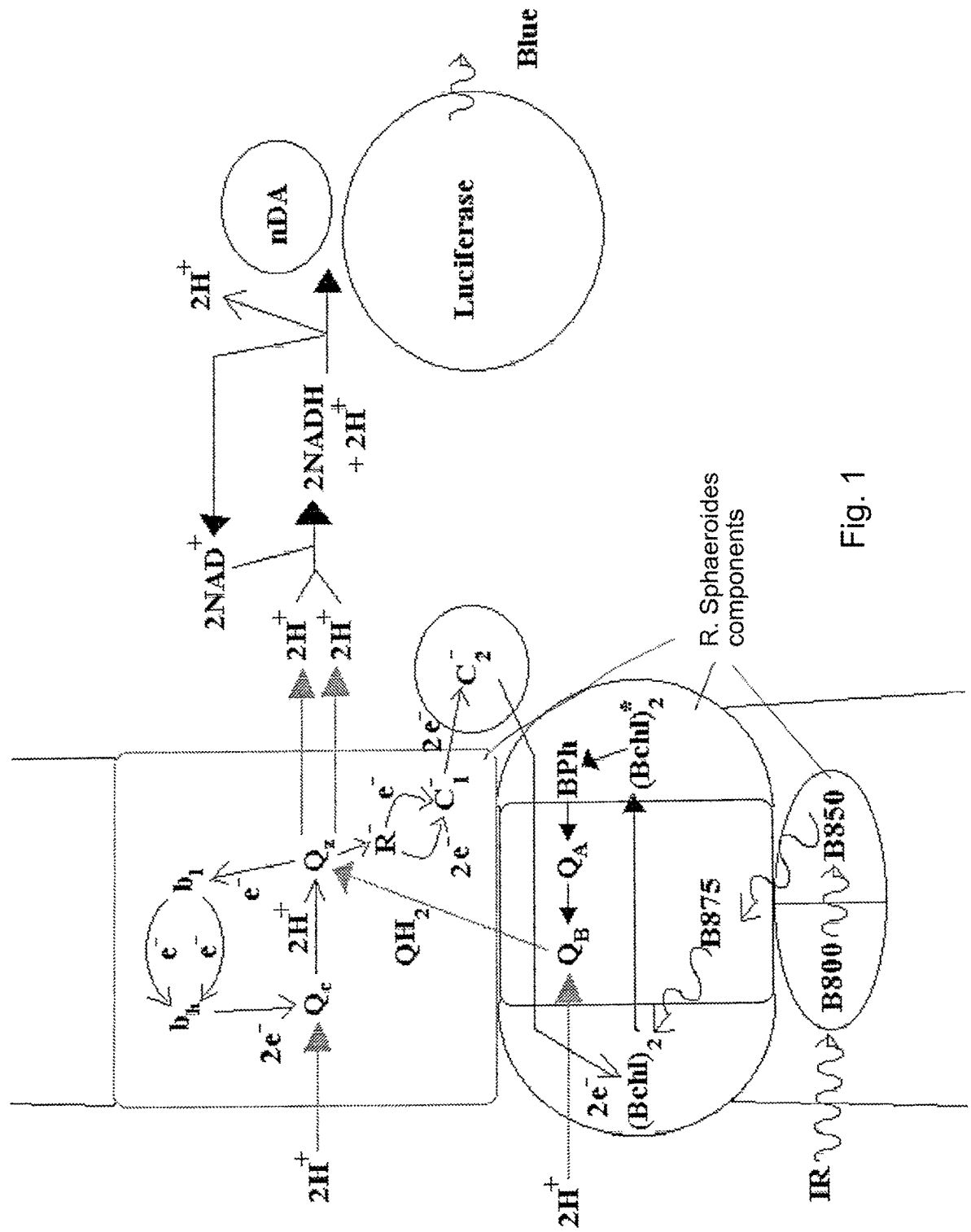
FIG. 1 is a schematic drawing of an embodiment depicting the chemistry associated with converting IR light to blue light of the visible spectra.

As depicted, for example, in FIG. 1, methods and apparatus of the invention relate to a chemical transfer of light from the IR (800-900 nm) to blue-green (400-500 nm) spectra. The process begins by stimulating the $bc_1$ complex (critical role in biochemical generation of ATP) and reaction center of an extremophile. Once stimulated, a proton gradient is produced and released into the periplasmic space of the bacteria.

The protons are then released from the periplasmic space and are exposed to a-Nicotinamide Adenine Dinucleotide ($NAD^+$) that is in solution. The resultant oxidation-reduction reaction leaves a reduced NADH that reacts with flavin mononucleotide—also in solution. The product, $FMNH_2$, encounters Luciferase (bacterial) and nDecyl Aldehyde, causing the Luciferase to catalyze a reaction. In this reaction that causes luminescence, the reduced flavin mononucleotide ($FMNH_2$) oxidizes a long-chain aliphatic aldehyde (RCHO) to an aliphatic carboxylic acid (RCOOH). The reaction forms an excited hydroxyflavin intermediate, which is dehydrated to the product FMN.

EXAMPLES

Figure 2:
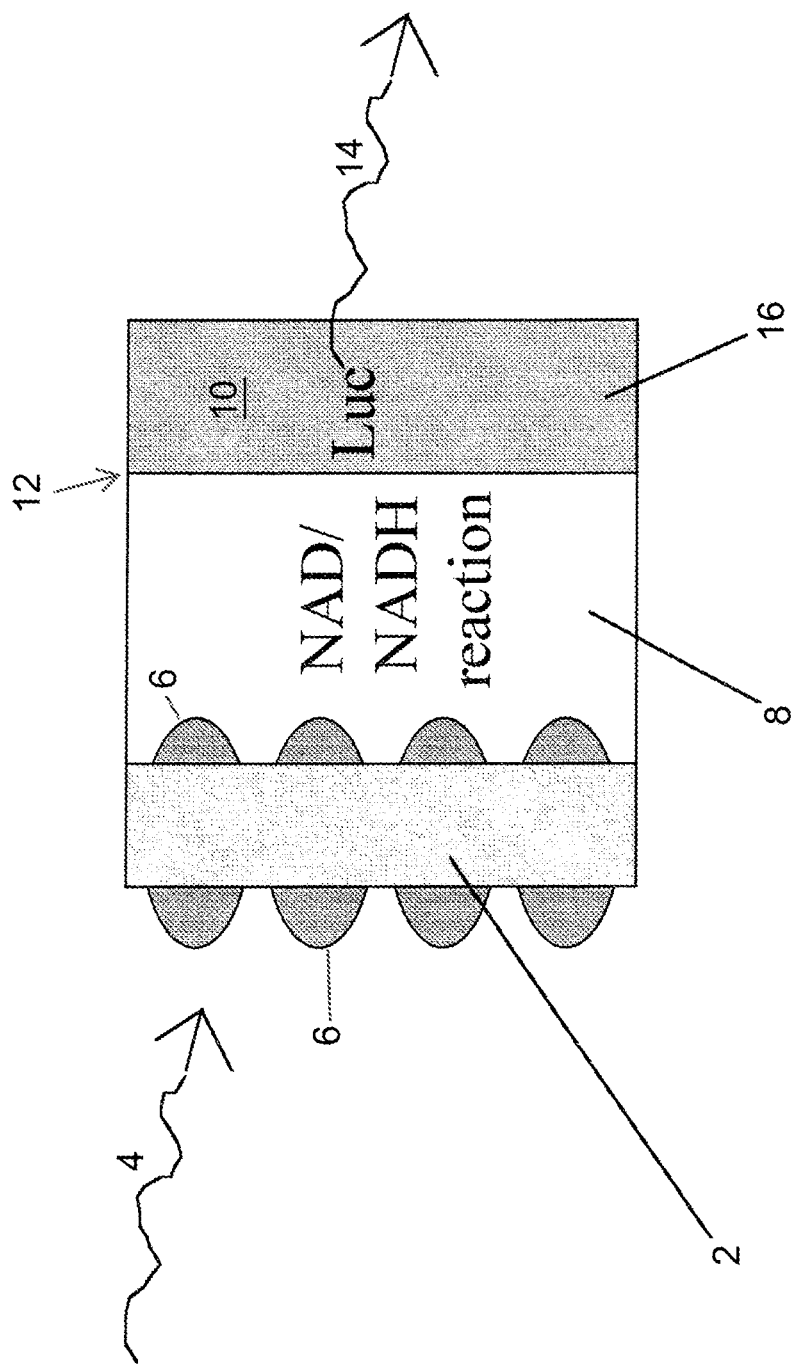
FIG. 2 depicts an embodiment of an enhanced vision light amplification device.

In one device embodiment (shown in FIG. 2), an objective lens 2 captures ambient light and some near-infrared light 4. Immobilized on the lens is the bacteriochlorophyll (bc1) complex and reaction center (collectively 6) of photosynthetic bacteria, such as the B800/B850, B875, $QH_2$ and related components of *R. Sphaeroides* (see FIG. 1), which are stimulated by the gathered light. Once stimulated, a proton gradient is produced and released into a solution in contained area 8. This initial reaction takes the place of a photocathode that one would find in a normal night-vision device.

It should be noted that artificial photosynthesis platforms are readily available and may include, for example, microfluidic artificial photosynthetic platforms that incorporate quantum dots and redox enzymes for photoenzymatic synthesis of fine chemicals under certain spectra of light. Similar to natural photosynthesis, photochemical cofactor regeneration takes place in the light-dependent reaction zone, which is then coupled with the light-independent, enzymatic synthesis in the downstream of the microchannel.

The proton gradient is first exposed to a-Nicotinamide Adenine Dinucleotide (NAD+) as shown an area 8. The resultant oxidation-reduction reaction leaves a reduced NADH that reacts with flavin mononucleotide—which also is in solution. The product, FMNH2, encounters Luciferase (bacterial) and nDecyl Aldehyde, causing the Luciferase in contained area 10 to catalyze a reaction and emit light. Areas 8 and 10 are seperated from each other by a thin film or membrane 12, such as poly(2-hydroxyethyl methacrylate). The film or membrane 12 is permeable to protons and to certain molecules, such as FMNH2, such that light amplification can occur in area 10.

In the reaction, the reduced flavin mononucleotide (FMNH2) oxidizes a long-chain aliphatic aldehyde (RCHO) to an aliphatic carboxylic acid (RCOOH). The reaction forms an excited hydroxyflavin intermediate, which is dehydrated to the product FMN.

The reaction described above produces phosphorescence in the blue-green region of the visible spectra. Luciferase's catalytic activity results in signal amplification 14, allowing low levels of light to be intensified to a visibly significant luminescence. The signal gain from the enzymatic activity is significant compared to the standard micro-channel plates used in current night-vision devices. Moreover, the device does not require the application of the accelerating voltage used in micro-channel plates, removing the need for an external power source.

The image created by the blue light is viewed through another lens, called the ocular lens 16, which allows one to magnify and focus the image.

Among the improvements believed to be provided by the embodiments herein are greater signal gain compared to the standard micro-channel plates used in current night-vision devices. Moreover, the ability to downsize the night vision device has huge implications when it comes to producing and using the technology.

Figure 3:
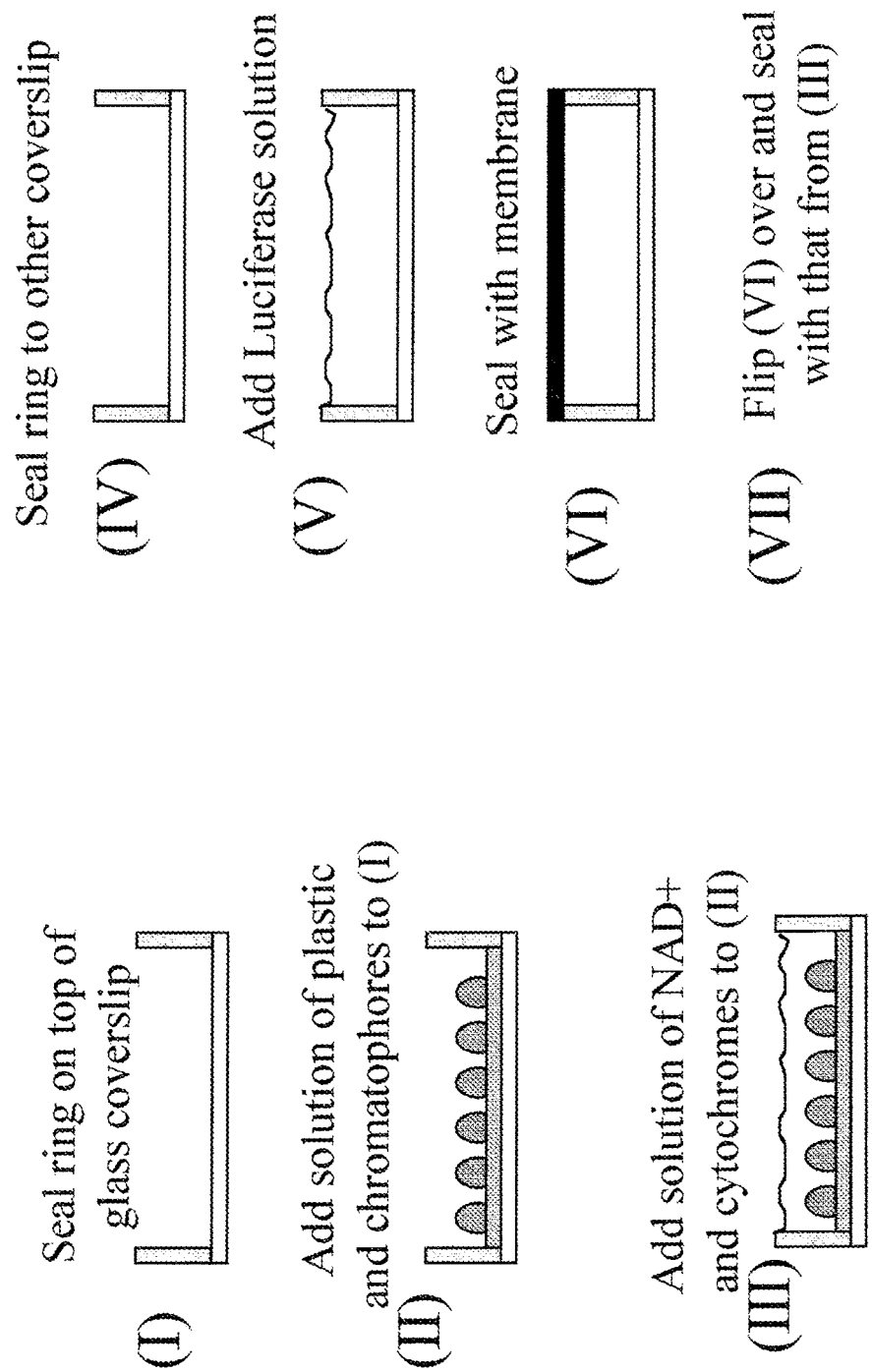
FIG. 3 depicts an example of the fabrication of a light amplification device according the invention.

FIG. 3 depicts an example of the fabrication of a light amplification device according the embodiment described above and in FIG. 2. However, there are actually many ways that a device of the invention could be made. For example, bubble contacts lens (or film) could be utilized, with such lenses basically being blow molded with a hollow inside and the complete reaction is in the aqueous phase. Moreover, covalent immobilization of materials on pillars inside the film may be utilized, as well as channels made inside a thin film holding a solution or stacks electroplated or deposited to the film. Such materials and techniques are well known in the art.

Figure 4:
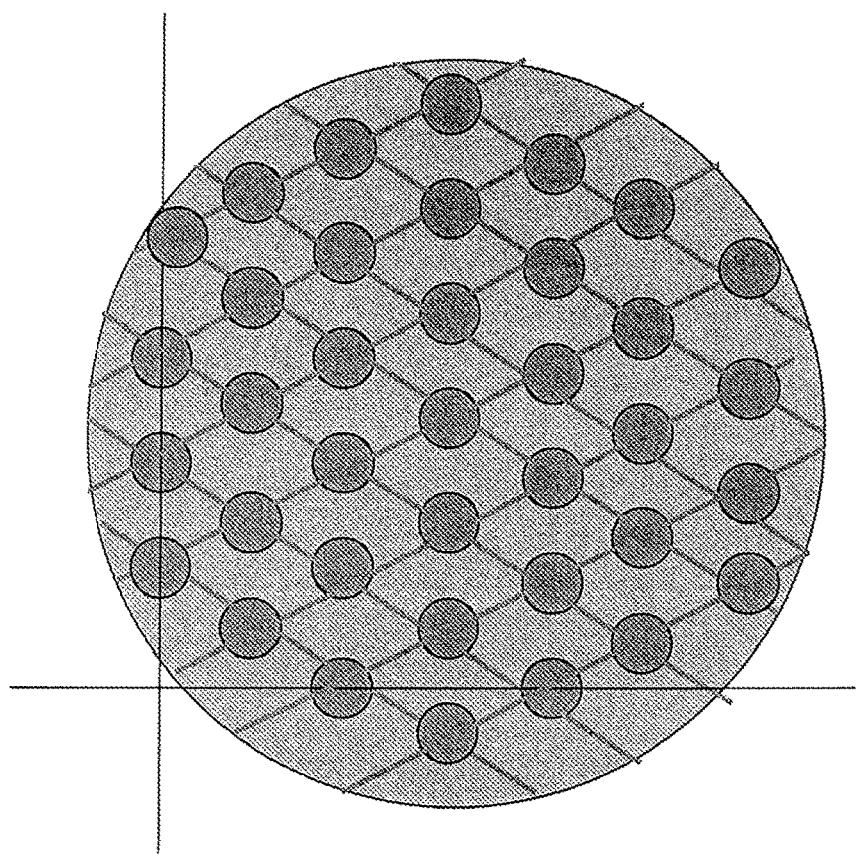
FIG. 4 depicts two views of a second embodiment of an enhanced-vision light amplification device.
Figure 4:
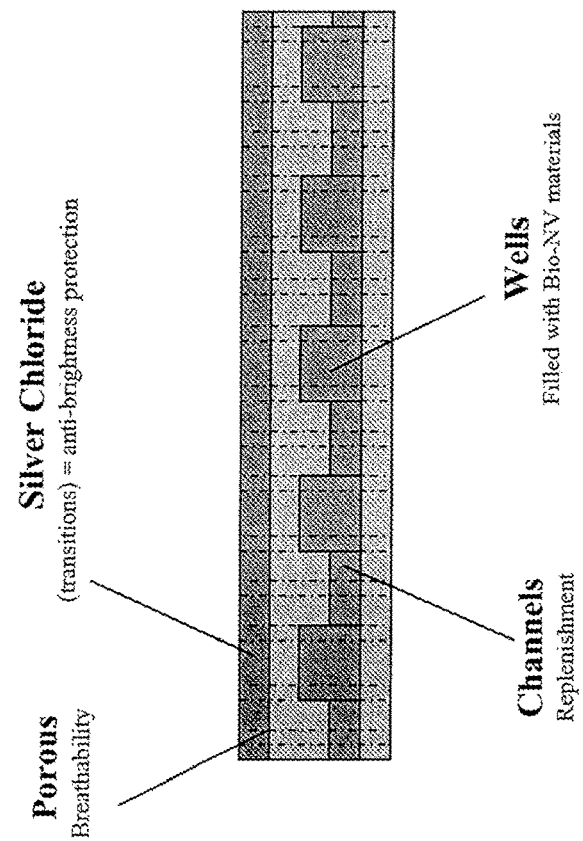

FIG. 4 depicts two views of a second embodiment of an enhanced vision light amplification device. This device is fabricated as a contact lens to be worn on the eye. As can be seen, multiple wells filled with biological night-vision materials are connected by channels with solution chemistry so that protons are provided to and amplified by the biological components. Both the wells and channels are encased by gas permeable membrane suitable for use on the eye as a contact lens. Optionally, a silver chloride coating provides anti-brightness protection.

The proton gradient is first exposed to a-Nicotinamide Adenine Dinucleotide (NAD+). The resultant oxidation-reduction reaction leaves a reduced NADH that reacts with flavin mononucleotide—also in solution. The product, FMNH$_2$, encounters Luciferase (bacterial) and nDecyl Aldehyde, causing the Luciferase to catalyze a reaction. In this reaction that causes luminescence, the reduced flavin mononucleotide (FMNH$_2$) oxidizes a long-chain aliphatic aldehyde (RCHO) to an aliphatic carboxylic acid (RCOOH). The reaction forms an excited hydroxyflavin intermediate, which is dehydrated to the product FMN.

The reaction also results in products of consumed n-Decanoic Acid (capric acid), water and phosphorescence in the blue region of the spectra. The reaction catalyzed by the Luciferase causes amplification.

It should be noted that the use of Luciferase is by way of example only, with any bioluminescence or phosphorescent material that can be driven by a proton gradient to amplify light being useable. For example, the company Sigma-Aldrich offers a broad range of fluorophores sensitive to pH, such as fluoresceins and carboxyfluoresceins.

Various changes in the details and components that have been described may be made by those skilled in the art within the principles and scope of the invention herein described in the specification and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

What is claimed is:

1. A vision enhancement device comprising a biologically-based light amplification system including a reaction center, a proton gradient area comprising reactants Nicotinamide Adenine Dinucleotide (NAD+) and flavin mononucleotide, and a light amplification area, wherein said reaction center comprises photosynthetic bacterial components capable of producing a proton gradient from light, said device configured such that light entering the system through the reaction center produces said proton gradient, which in turn acts upon reactants in said proton gradient area, and causes to produce a product, flavin mononucleotide (FMNH$_2$) to enter the light amplification area and thereby drive a bioluminescence or phosphorescent reaction to amplify said light, wherein said reaction center is coupled to said proton gradient area, said proton gradient area contains reactants acted on by said proton gradient, and said proton gradient area is coupled to said light amplification area.

2. The device of claim 1, wherein said light is infrared (IR) light.

3. The device of claim 1, wherein said bacterial components comprise *R. Sphaeroides* photosynthesis components.

4. The device of claim 1, further including an ocular lens coupled to said light amplification area.

5. The device of claim 1, wherein said light amplification area contains luciferase and all other reactants required to produce bioluminences from luciferase and FMNH$_2$ formed in said proton gradient area.

6. The device of claim 1, wherein said reaction center, proton gradient area, and light amplification area are formed into a contact lens.

7. The device of claim 1, wherein said proton gradient area and said light amplification area are seperated by a membrane.

8. A method for enhancing vision in low light or night conditions, comprising the step of amplifying light using a biologically-based light amplification system including a reaction center, a proton gradient area comprising reactants Nicotinamide Adenine Dinucleotide ($NAD^+$) and flavin mononucleotide, and a light amplification area, said system configured such that light entering the system through the reaction center produces a proton gradient, which in turn acts upon reactants in said proton gradient area, and causes to produce a product, flavin mononucleotide ($FMNh_2$) to enter the light amplification area and thereby drive a bioluminescence or phosphorescent reaction to amplify said light, wherein said reaction center is coupled to said proton gradient area, said proton gradient area contains reactants acted on by said proton gradient, and said proton gradient area is coupled to said light amplification area.

9. The method of claim 8, wherein red light is converted to blue light.

10. An IR light vision enhancement device comprising a biologically-based light amplification system including a reaction center, a proton gradient area comprising reactants Nicotinamide Adenine Dinucleotide ($NAD_+$) and flavin mononucleotide, and a light amplification area, wherein said reaction center comprises photosynthetic bacterial components capable of producing a proton gradient from light, said device configured such that light entering the system through the reaction center produces said proton gradient, which in turn acts upon reactants in said proton gradient area, and causes to produce a product, flavin mononucleotide ($FMNH_2$) to enter the light amplification area and thereby drive a bioluminescence reaction to amplify said light; wherein said reaction center is coupled to said proton gradient area, said proton gradient area contains reactants acted on by said proton gradient, and said proton gradient area is coupled to said light amplification area.

11. The device of claim 10, wherein said bacterial components comprise *R. Sphaeroides* photosynthesis components.

12. The device of claim 10, further including an ocular lens coupled to said light amplification area.

13. The device of claim 10, wherein said light amplification area contains luciferase and all other reactants required to produce bioluminences from luciferase and $FMNH_2$ formed in said proton gradient area.

14. The device of claim 10 wherein said reaction center, proton gradient area, and light amplification area are formed into a contact lens.

15. The device of claim 10, wherein said proton gradient area and said light amplification area are coupled by a membrane.

\* \* \* \* \*